United States Patent
Zhang et al.

(10) Patent No.: US 8,472,814 B2
(45) Date of Patent: Jun. 25, 2013

(54) APPARATUS AND METHOD FOR EQUALIZING CHROMATIC DISPERSION AND DIGITAL COHERENT OPTICAL RECEIVER

(75) Inventors: Huijian Zhang, Beijing (CN); Zhenning Tao, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 12/835,251

(22) Filed: Jul. 13, 2010

(65) Prior Publication Data
US 2011/0064421 A1 Mar. 17, 2011

(51) Int. Cl.
*H04B 10/00* (2006.01)

(52) U.S. Cl.
USPC .................... 398/208; 398/203; 398/158

(58) Field of Classification Search
USPC ................. 398/202–214, 158, 159
See application file for complete search history.

(56) References Cited

U.S. PATENT DOCUMENTS

| | | | |
|---|---|---|---|
| 7,076,169 B2* | 7/2006 | Shpantzer et al. | 398/76 |
| 7,596,323 B1* | 9/2009 | Price et al. | 398/141 |
| 7,899,340 B1* | 3/2011 | Bontu et al. | 398/209 |
| 7,936,999 B1* | 5/2011 | Hawryluck et al. | 398/206 |
| 8,023,402 B2* | 9/2011 | Roberts et al. | 370/210 |
| 8,023,834 B2* | 9/2011 | Koc | 398/202 |
| 8,073,345 B2* | 12/2011 | Chen et al. | 398/205 |
| 8,078,066 B2* | 12/2011 | Li et al. | 398/209 |
| 8,095,019 B2* | 1/2012 | Kaneda et al. | 398/208 |
| 8,103,177 B2* | 1/2012 | Zhang et al. | 398/208 |
| 2009/0080906 A1* | 3/2009 | Tao et al. | 398/209 |
| 2009/0129787 A1* | 5/2009 | Li et al. | 398/208 |
| 2009/0190926 A1* | 7/2009 | Charlet et al. | 398/74 |
| 2009/0245815 A1* | 10/2009 | Zhang et al. | 398/208 |
| 2010/0119241 A1* | 5/2010 | Yang et al. | 398/208 |

* cited by examiner

*Primary Examiner* — Agustin Bello
(74) *Attorney, Agent, or Firm* — Staas & Halsey LLP

(57) ABSTRACT

This application relates to an apparatus and a method for equalizing chromatic dispersion and a digital coherent optical receiver. The apparatus for equalizing chromatic dispersion comprising: a chromatic dispersion equalizing unit, for compensating chromatic dispersion of an input signal; and an additional time delay removing unit, for removing, in accordance with frequency offset of the input signal, chromatic dispersion equalization time delay generated by the chromatic dispersion equalizing unit.

10 Claims, 8 Drawing Sheets

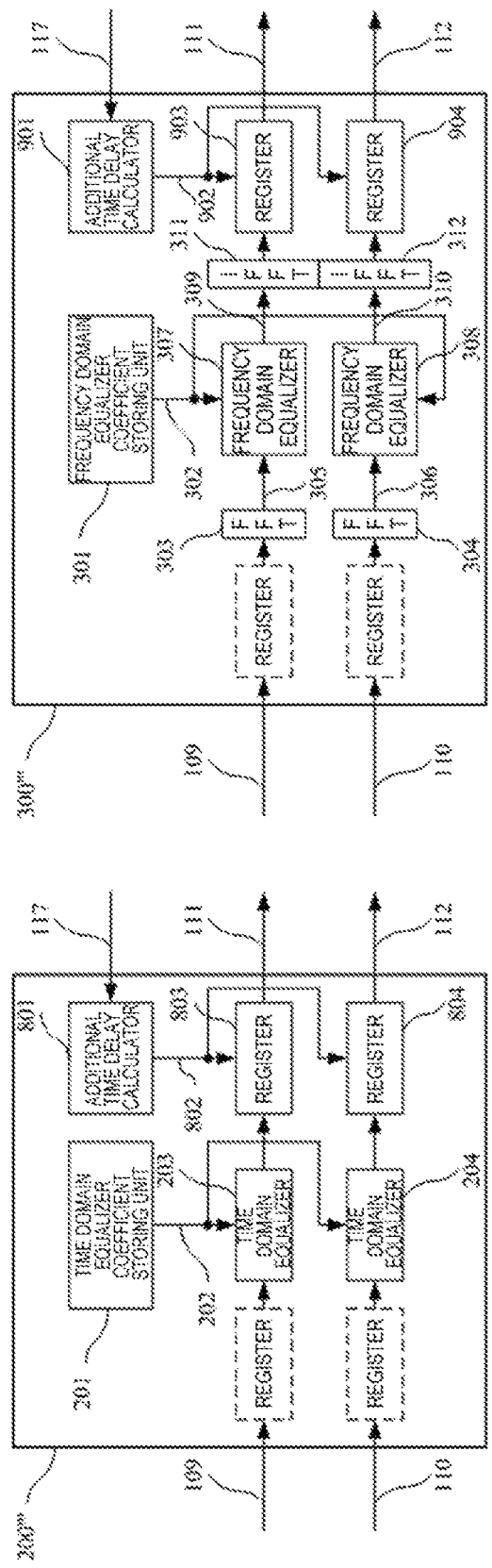

APPARATUS AND METHOD FOR EQUALIZING CHROMATIC DISPERSION AND DIGITAL COHERENT OPTICAL RECEIVER

CROSS REFERENCE TO RELATED APPLICATIONS

This application is a continuation of and claims the benefit under 35 U.S.C. Section 111(a), of PCT International Application No. PCT/CN2009/071057, filed Mar. 27, 2009, the entire disclosures of which are incorporated by reference as a part of this application.

FIELD OF THE DISCLOSURE

The present disclosure relates generally to optical communication, and more specifically to apparatus and method for equalizing chromatic dispersion and digital coherent optical receiver.

BACKGROUND

Digital coherent optical receiver presents advantages of high sensitivity, excellent electric-equalization capability, high spectrum efficiency, etc., and thus is believed to be a key technology for high speed optical communication system.

In a coherent optical receiver, a signal light is mixed with a local oscillation (LO) light generated by a local oscillator, whereby the magnitude and phase information of the signal light is transferred to a base band electric signal. An original transmit signal can be finally recovered by sampling, quantizing and digital-signal-processing the base band electric signal. It is possible to compensate almost completely the linear damage (e.g. chromatic dispersion and polarization mode dispersion, etc.) of an optical signal by electric-equalization technology, since coherent detection keeps all the information of an optical field. The damage amount (e.g. chromatic dispersion amount) that can be compensated by a digital coherent optical receiver depends solely on the scale of digital circuit (e.g. the tap number of a finite impulse response (FIR) filter). S. J. Savory et al. verified, in off-line tests, the feasibility of a coherent optical communication system without in-line dispersion compensation. They applied dispersion compensation to a polarization multiplexed 42.8 Gb/s NRZ-QPSK signal, which was transmitted 6400 km in a standard single mode fiber link, by using a FIR filter with 512 taps. The optical signal to noise ratio (OSNR) penalty of the thus compensated signal is merely 1.2 dB. (S. J. Savory, G. Gavioli, R. I. Killey, P. Bayvel, "Transmission of 42.8 Gbit/s polarization multiplexed NRZ-QPSK over 6400 km of standard fiber with no optical dispersion compensation", OFC2007, OTuA1.)

Figure 1A:
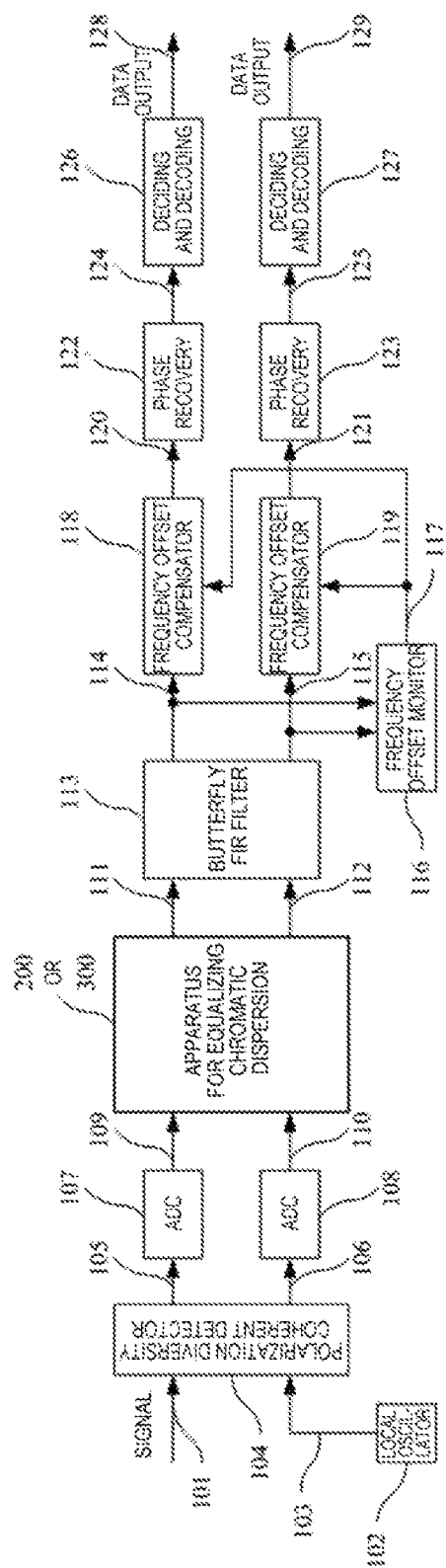

On the other hand, as shown in FIG. 1(a), it is common that the electric equalization function is separated into an equalizer with fixed coefficient and a short FIR filter that is controlled by an adaptive algorithm. FIG. 1(a) schematically illustrates the structure of a conventional polarization diversity coherent optical receiver. A double-polarization optical signal 101 and a continuous light 103, which is generated by a local oscillation laser 102, are mixed and optical-electric converted in a polarization diversity coherent detector 104, resulting in complex base band electric signals 105 and 106 which carry the information about two polarization states of the double-polarization optical signal 101. The complex base band electric signals 105 and 106 are converted into complex digital signal sequences 109 and 110 respectively by analog-to-digital converters 107 and 108, and then are processed by a chromatic dispersion equalizer 200 or 300 to coarsely compensate large chromatic dispersion. The coarsely dispersion-compensated signals 111 and 112 are fed into an adaptive butterfly FIR filter 113 with relatively small tap number to undergo chromatic dispersion compensation, polarization mode dispersion compensation and polarization demultiplex accurately. The adaptive butterfly FIR filter 113 is controlled by a relevant algorithm, and its tap coefficient is adjusted dynamically so that channel variation can be monitored and compensated in real-time. The output signals 114 and 115 of the adaptive butterfly FIR filter 113 are fed into frequency offset compensator 118 and 119 respectively, while a frequency offset monitor 116 estimates the difference between the carrier frequency of the received optical signal 101 and frequency of the local oscillation laser according to the signals 114 and 115, and inputs the difference into the frequency offset input ports of the frequency offset compensators 118 and 119 respectively. After the frequency offset compensation, the output signal 120 of the frequency offset compensator 118 and the output signal 121 of the frequency offset compensator 119 are phase-recovered via phase recovery units 122 and 123 respectively, resulting in phase-recovered signals 124 and 125. Finally, the signals 124 and 125 are decided and decoded by the deciding and decoding unit 126 and 127 respectively, resulting in data 128 and 129.

The chromatic dispersion equalizer 200 (or 300) in FIG. 1(a) is for the purpose of coarse compensation of dispersion, so that remaining dispersion comes within the compensation scope of the adaptive filter 113. The chromatic dispersion equalizer can process the signal in either time domain or frequency domain.

Figure 1C:
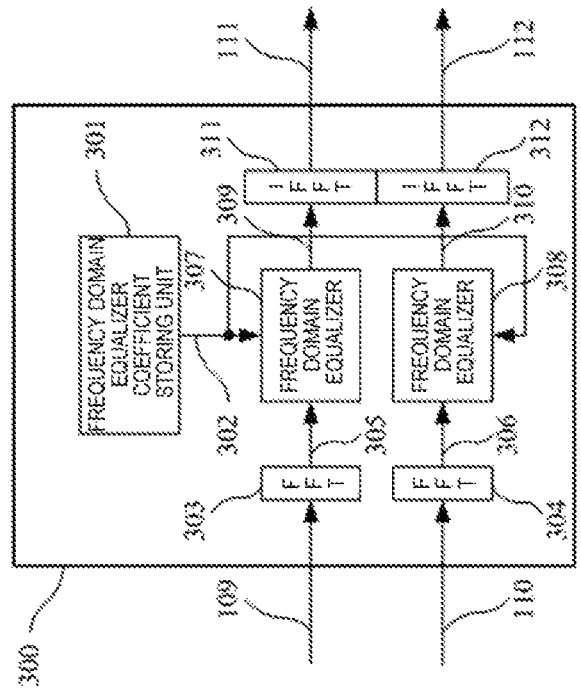
Figure 1B:
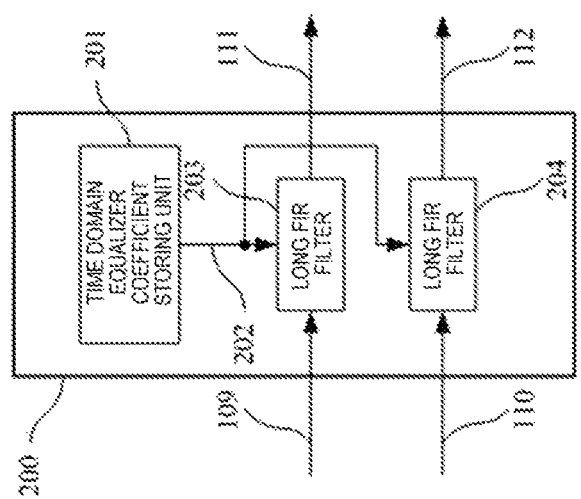

The structure of the time domain chromatic dispersion equalizer 200 is illustrated in FIG. 1(b). The input signals 109 and 110 of the time domain chromatic dispersion equalizer 200 are fed into filters 203 and 204 respectively, resulting in equalized signals 111 and 112. Since dispersion amount to be compensated is generally large, the filters 203 and 204 may have taps up to tens or even hundreds, and thus are called long FIR filters. A time domain equalizer coefficient storage unit 201 stores filter tap coefficient values 202 corresponding to groups of different dispersion compensation amount. The time domain equalizer coefficient storage unit 201 inputs the tap coefficient value 202 into the filters 203 and 204. Since the dispersion value of a fiber link will not change substantially for a long time, it is not necessary for the filters 203 and 204 to update the coefficient for a long time after reading it from the time domain equalizer coefficient storage unit 201.

The time domain chromatic dispersion equalizer 200 actually performs discrete convolution operation on a discrete time signal, and its algorithm is a relatively complex one. By using fast Fourier algorithm to convert a time domain signal into frequency domain signal for processing, it is possible to substantially reduce the operation amount. FIG. 1(c) illustrates the structure of a frequency domain chromatic dispersion equalizer 300 based on this idea. In the frequency domain chromatic dispersion equalizer 300, fast Fourier transformers 303 and 304 transform the input time domain digital signal sequences 109 and 110 into frequency domain respectively, resulting in frequency domain signals 305 and 306, which are input to frequency domain equalizers (e.g. frequency domain filters) 307 and 308 respectively. In the frequency domain equalizers 307 and 308, the frequency domain signals 305 and 306 are multiplied with an inverse function of the dispersion transfer function which uses the equalizer coefficient stored in the frequency domain equalizer coefficient storage unit 301, resulting in dispersion-compensated frequency domain signals 309 and 310 respectively.

Finally, the signals 309 and 310 are converted back to time domain by fast inverse Fourier transformers 311 and 312, outputting dispersion-compensated time domain signals 111 and 112. The calculation of linear convolution by fast Fourier transform belongs to prior art.

In the course of implementing the present disclosure, the inventors found the performance of the conventional optical coherent receiver is not satisfactory.

The following reference documents of the present disclosure are incorporated herein by reference, as if they are described entirely in the present disclosure:

1. Chinese patent application No. 200810090227.4 entitled "frequency offset detection apparatus and method used in digital coherent optical receiver".

2. Chinese patent application No. 200810108921.4 entitled "filter coefficient adjusting apparatus and method".

SUMMARY OF THE INVENTION

In view of the above conditions, the present invention is provided to overcome one or more shortages of the prior art, and give at least one beneficial choice.

In order to achieve the above object, the application provides the following aspects.

Aspect 1

An apparatus for equalizing chromatic dispersion, comprising: a chromatic dispersion equalizing unit, for compensating chromatic dispersion of an input signal; and an additional time delay removing unit, for removing, in accordance with frequency offset of the input signal, chromatic dispersion equalization time delay generated by the chromatic dispersion equalizing unit.

Aspect 2

The apparatus for equalizing chromatic dispersion according to aspect 1, characterized in that the chromatic dispersion equalizing unit includes a first time domain equalizer and a second time domain equalizer; and the additional time delay removing unit includes a time domain equalizer coefficient storing unit and a time domain equalizer coefficient correcting unit, of which the time domain equalizer coefficient storing unit stores time domain equalizer coefficients used by the first time domain equalizer and the second time domain equalizer when the frequency offset is supposed to be zero, and the time domain equalizer coefficient correcting unit corrects, in accordance with the frequency offset, the time domain equalizer coefficients and transmits the corrected time domain equalizer coefficients to the first time domain equalizer and the second time domain equalizer.

Aspect 3

The apparatus for equalizing chromatic dispersion according to aspect 1, characterized in that:

the chromatic dispersion equalizing unit includes a first frequency domain equalizer and a second frequency domain equalizer; and the additional time delay removing unit includes an frequency domain equalizer coefficient storing unit and an equalizer coefficient correcting unit, of which the frequency domain equalizer coefficient storing unit stores frequency domain equalizer coefficients used by the first frequency domain equalizer and the second frequency domain equalizer when the frequency offset is supposed to be zero, and the frequency domain equalizer coefficient correcting unit corrects, in accordance with the frequency offset, the frequency domain equalizer coefficients and transmits the corrected frequency domain equalizer coefficients to the first frequency domain equalizer and the second frequency domain equalizer.

Aspect 4

The apparatus for equalizing chromatic dispersion according to aspect 1, characterized in that:

the chromatic dispersion equalizing unit includes a first time domain equalizer and a second time domain equalizer; and the additional time delay removing unit includes a time domain equalizer coefficient calculating unit for determining, in accordance with the frequency offset, time domain equalizer coefficients that should be used by the first time domain equalizer and the second time domain equalizer.

Aspect 5

The apparatus for equalizing chromatic dispersion according to aspect 1, characterized in that:

the chromatic dispersion equalizing unit includes a first frequency domain equalizer and a second frequency domain equalizer; and the additional time delay removing unit includes an frequency domain equalizer coefficient calculating unit for determining, in accordance with the frequency offset, frequency domain equalizer coefficients that should be used by the first frequency domain equalizer and the second frequency domain equalizer.

Aspect 6

The apparatus for equalizing chromatic dispersion according to aspect 1, characterized in that: the chromatic dispersion equalizing unit includes a first time domain equalizer and a second time domain equalizer; and the additional time delay removing unit includes an additional time delay calculator, a first register and a second register, wherein the first time domain equalizer is connected to the first register, the second time domain equalizer is connected to the second register, and the additional time delay calculator calculates, in accordance with the frequency offset, an additional time delay introduced by the chromatic dispersion equalizing unit, and instructs the first register and the second register to reduce the additional time delay.

Aspect 7

The apparatus for equalizing chromatic dispersion according to aspect 5, characterized in that the frequency domain equalizer coefficient calculating unit includes: an optical fiber transfer function determining unit, for determining a transfer function of an optical fiber; an inverse function of optical fiber transfer function determining unit, for calculating an inverse function of the transfer function of the optical fiber determined by the optical fiber transfer function determining unit; a windowing unit, for adding window to the inverse function determined by the inverse function of optical fiber transfer function determining unit; and a frequency domain equalizer coefficient determining unit, for determining the frequency domain equalizer coefficients in accordance with the windowed inverse function.

Aspect 8

The apparatus for equalizing chromatic dispersion according to aspect 1, characterized in that:

the chromatic dispersion equalizing unit includes: a first FFT unit, a first frequency domain equalizer, and a first IFFT unit which are connected in series, and a second FFT unit, a second frequency domain equalizer, and a second IFFT unit which are connected in series; and the additional time delay removing unit includes an additional time delay calculator, a first register and a second register, wherein the first FFT unit or the first IFFT unit is connected to the first register, the second FFT unit or the second IFFT unit is connected to the second register, and the additional time delay calculator calculates, in accordance with the frequency offset, an additional time delay introduced by the chromatic dispersion equalizing unit, and instructs the first register and the second register to reduce the additional time delay.

Aspect 9

The apparatus for equalizing chromatic dispersion according to aspects 6 or 8, characterized in that the additional time delay calculator calculates the additional time delay in accordance with an expression of $$\frac{2\pi V_L D\Delta\omega}{\omega_0^2},$$

where $\omega_0$ is optical carrier frequency of a transmitter, $\Delta\omega$ is frequency offset between signal and local oscillation, $V_L$ is vacuum light velocity, and D is total value of chromatic dispersion of a transmission link.

Aspect 10

The apparatus for equalizing chromatic dispersion according to aspect 4, characterized in that the time domain equalizer coefficient calculating unit includes: an optical fiber transfer function determining unit, for determining a transfer function of an optical fiber; an inverse function of optical fiber transfer function determining unit, for calculating an inverse function of the transfer function of the optical fiber determined by the optical fiber transfer function determining unit; a windowing unit, for adding window to the inverse function determined by the inverse function of optical fiber transfer function determining unit; and a time domain equalizer coefficient determining unit, for determining the time domain equalizer coefficients in accordance with the windowed inverse function.

Aspect 11

A method for equalizing chromatic dispersion, comprising: a chromatic dispersion equalizing step, for compensating chromatic dispersion of an input signal; and an additional time delay removing step, for removing, in accordance with frequency offset of the input signal, chromatic dispersion equalization time delay generated in the chromatic dispersion equalizing step.

Aspect 12

A digital coherent optical receiver, comprising a frequency offset monitor, characterized in that the digital coherent optical receiver includes the apparatus for equalizing chromatic dispersion according to any one of aspects 1 to 9, and that the additional time delay removing unit removes, in accordance with frequency offset from the frequency offset monitor, chromatic dispersion equalization time delay generated by the chromatic dispersion equalizing unit.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

EXPLANATION OF THE ACCOMPANYING DRAWINGS

With reference to the accompanying drawings, the various objectives, features, aspects and advantages of the present invention will become more apparent from the detailed description of the preferred embodiments below. Identical numerals in the drawings indicate identical component parts.

FIG. 1(a) schematically illustrates the structure of a conventional polarization diversity coherent optical receiver.

FIG. 1(b) schematically illustrates the structure of the time domain chromatic dispersion equalizer that may be used for the polarization diversity coherent optical receiver in FIG. 1(a).

FIG. 1(c) schematically illustrates the structure of the frequency domain chromatic dispersion equalizer that may be used for the polarization diversity coherent optical receiver in FIG. 1(a).

Figure 2:
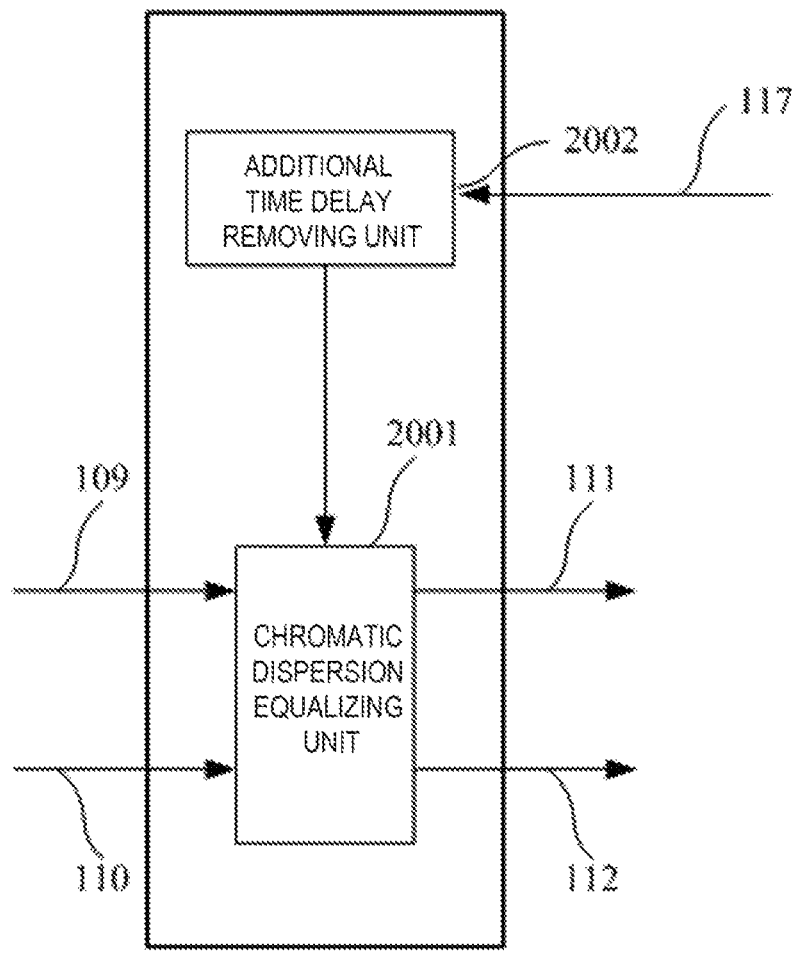

FIG. 2 is a view schematically illustrating the structure of the apparatus for equalizing chromatic dispersion according to one embodiment of the present invention.

Figure 3:
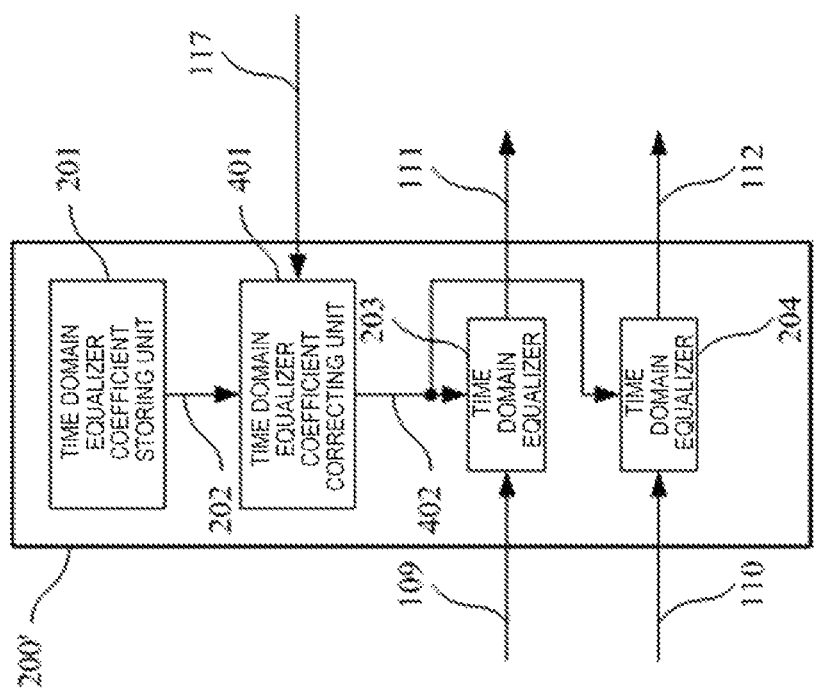

FIG. 3 schematically illustrates the structure of an apparatus for equalizing chromatic dispersion in time domain according to one embodiment of the present invention.

Figure 4:
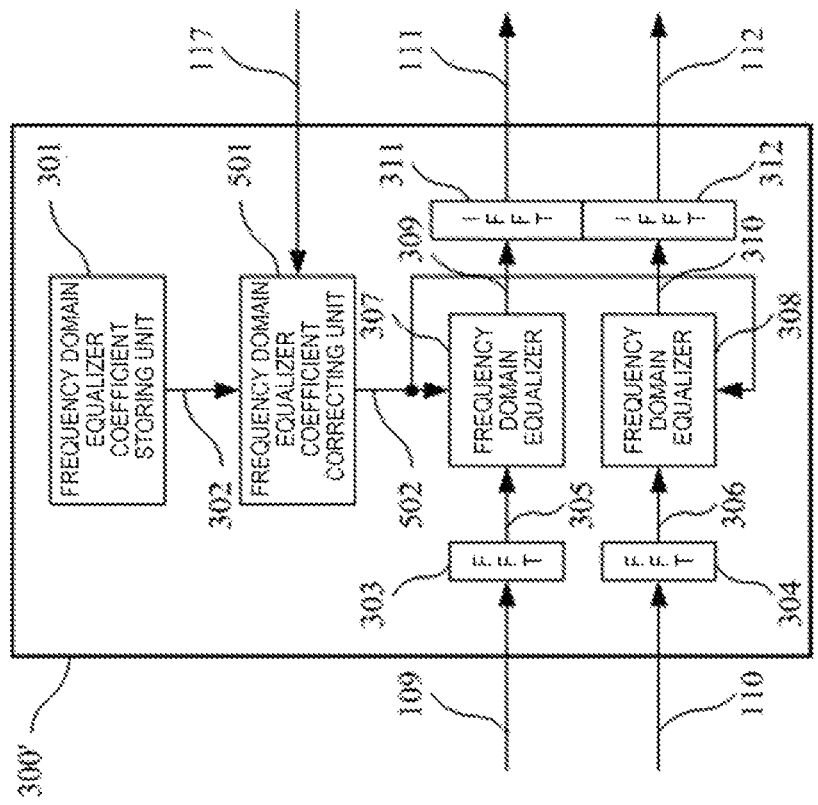

FIG. 4 schematically shows a structure diagram of an apparatus for equalizing chromatic dispersion in frequency domain according to one embodiment of the present invention.

Figure 5:
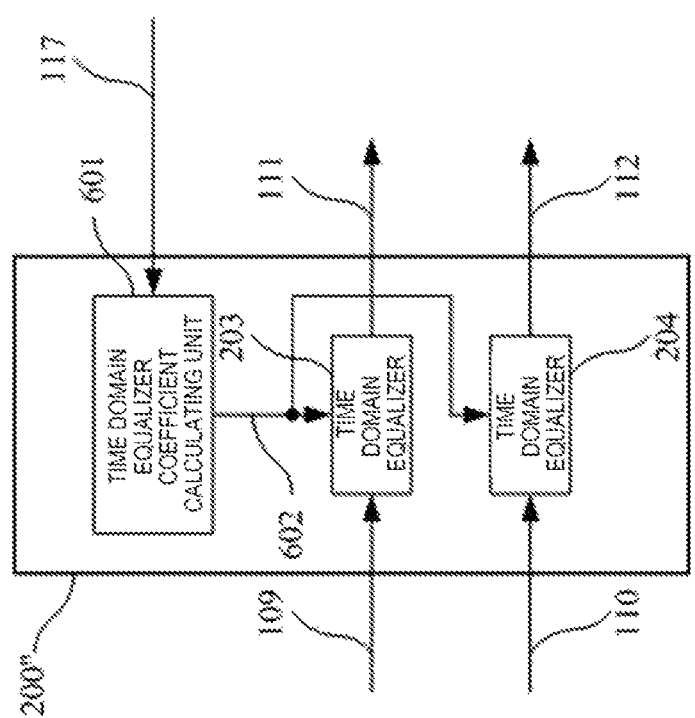

FIG. 5 schematically illustrates the structure of an apparatus for equalizing chromatic dispersion in time domain according to another embodiment of the present invention.

Figure 6:
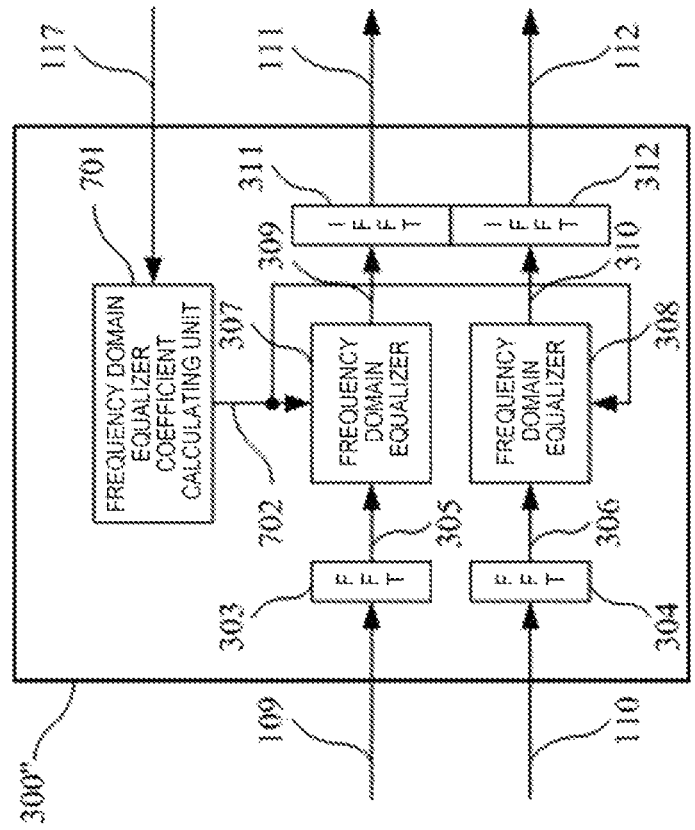

FIG. 6 schematically shows a structure diagram of an apparatus for equalizing chromatic dispersion in frequency domain according to another embodiment of the present invention.

Figure 7:
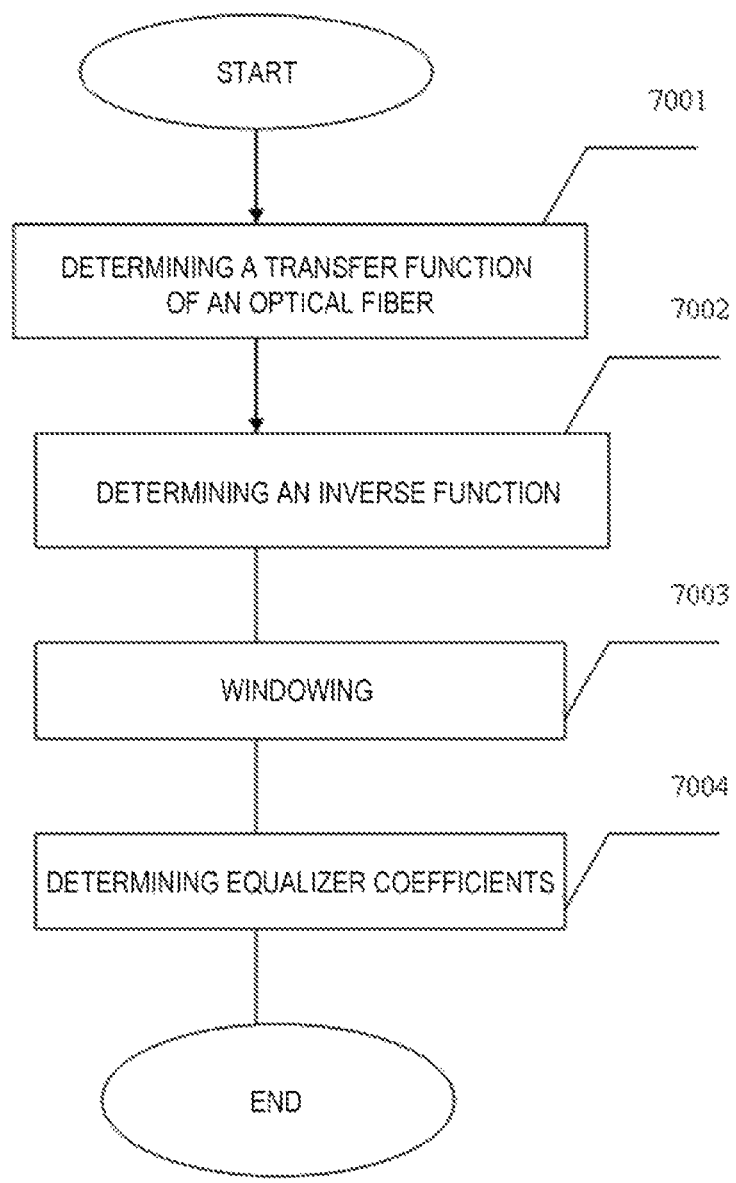

FIG. 7 is a process flowchart schematically showing the frequency domain equalizer coefficient calculating unit according to an embodiment of the present invention.

FIG. 8 schematically illustrates the structure of an apparatus for equalizing chromatic dispersion in time domain according to yet another embodiment of the present invention.

FIG. 9 schematically shows a structure diagram of an apparatus for equalizing chromatic dispersion in frequency domain according to yet another embodiment of the present invention.

Figure 10:
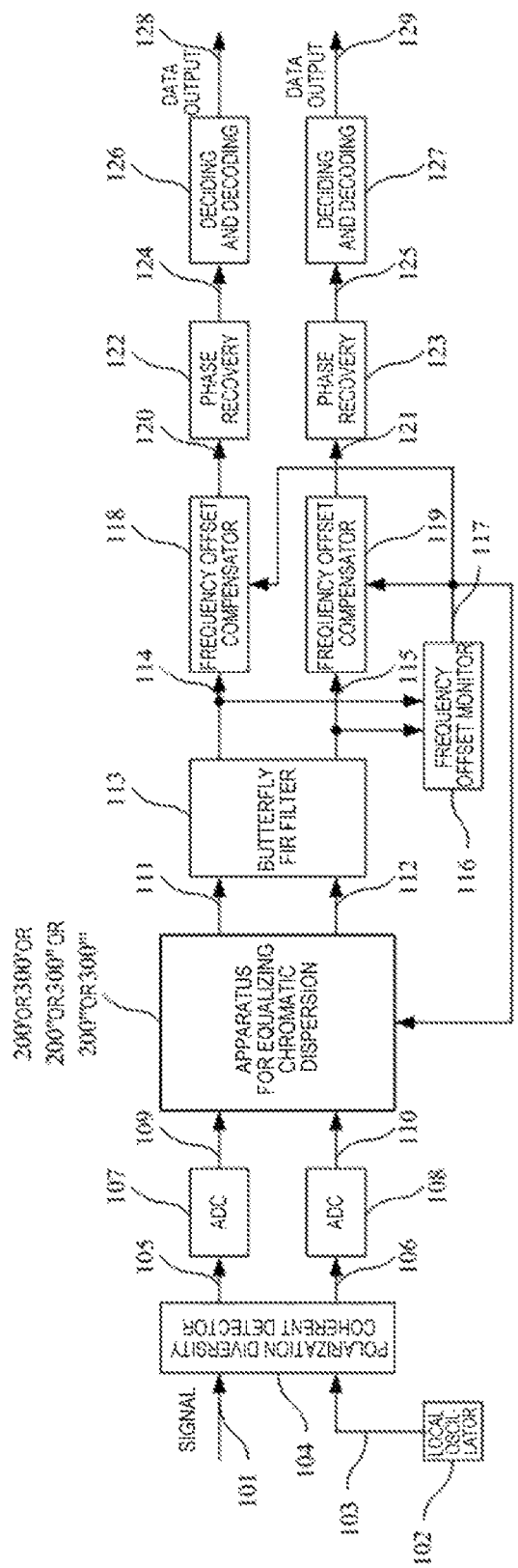

FIG. 10 is a diagram showing a digital coherent optical receiver using the chromatic dispersion equalizers of the present invention.

SPECIFIC EMBODIMENTS FOR CARRYING OUT THE INVENTION

Inventors of the present invention researched on the causes of inferior performance of prior art digital coherent optical receivers. It is found upon research that the filter coefficient of the chromatic dispersion equalizer 200 or 300 in the digital coherent optical receiver as shown in FIG. 1(a) is obtained by calculation carried out on presumption that there is no frequency offset between the signal light and the local oscillation light. Once signals 109 and 110 entering the chromatic dispersion equalizer 200 or 300 contain frequency offset, interaction between chromatic dispersion compensation and signal frequency offset will cause output signals 111 and 112 to generate time delay (chromatic dispersion equalization delay, and also referred to as additional time delay). The value of time delay is determined together by the coarse compensation amount for chromatic dispersion and the value of frequency offset, and a relatively great value of time delay might exceed the compensation scope of the downstream adaptive equalizer 113 to thereby affect system performance.

The influence of the interaction between chromatic dispersion compensation and frequency offset on the signal is deduced below. For the sake of convenience in expression, the signal is expressed as a continuous-time signal, and consideration is taken only of the damage to chrominance dispersion of optical fibers. Set the transmission optical signal as s(t)exp(jω₀t), the local oscillation light as exp[j(ω₀−Δω)t], and the frequency domain transfer function of optical fiber chrominance dispersion as $$\exp\left[j\frac{\pi V_L D}{\omega_0^2}(\omega-\omega_0)^2\right],$$

where s(t) is a baseband complex signal, $\omega_0$ is a transmitter optical carrier frequency, $\Delta\alpha$ is frequency offset between the signal and the local oscillation light, $V_L$ is vacuum light velocity, and D is the total chromatic dispersion value of the transmission link, and the unit thereof is usually ps/nm. Electric signal 109 or 110 entering the chromatic dispersion equalizer can be expressed in the frequency domain as $$\tilde{S}(\omega-\Delta\omega)\exp\left[j\frac{\pi V_L D}{\omega_0^2}(\omega-\Delta\omega)^2\right] \quad (1)$$

where $\tilde{S}(\omega)$ is Fourier transformation of s(t). If the amount of chromatic dispersion compensable by the chromatic dispersion equalizer is D−ΔD, its transfer function will be $$\exp\left[-j\frac{\pi V_L(D-\Delta D)}{\omega_0^2}\omega^2\right].$$

Output signal 111 or 112 of the chromatic dispersion equalizer can be expressed in the frequency domain as $$\tilde{S}(\omega-\Delta\omega)\exp\left[j\frac{\pi V_L D}{\omega_0^2}(\omega-\Delta\omega)^2 - j\frac{\pi V_L(D-\Delta D)}{\omega_0^2}\omega^2\right] = \quad (2)$$
$$\tilde{S}(\omega-\Delta\omega)\exp\left[j\frac{\pi V_L}{\omega_0^2}(\Delta D\omega^2 - 2D\Delta\omega\cdot\omega + D\Delta\omega^2)\right].$$

As can be easily seen from the above Equation, the first item in the index e corresponds to the residual chromatic dispersion, the second item corresponds to the time delay, and the third item corresponds to the phase shift. If the chromatic dispersion equalizer just completely compensates the chromatic dispersion, i.e. the residual chromatic dispersion ΔD=0, the time domain expression of the output signal will be $$s\left(t-\frac{2\pi V_L D\Delta\omega}{\omega_0^2}\right)\exp\left[j\Delta\omega\left(t-\frac{2\pi V_L D\Delta\omega}{\omega_0^2}\right)\right]\exp\left(j\frac{2\pi V_L D\Delta\omega^2}{\omega_0^2}\right). \quad (3)$$

That is to say, the signal has only undergone the processes of time delaying and phase rotation, and the value of time delay and the angle of phase rotation are respectively $$\frac{2\pi V_L D\Delta\omega}{\omega_0^2}$$

and $$\frac{\pi V_L D\Delta\omega^2}{\omega_0^2}.$$

Taking for example a DP-QPSK system of 112 Gb/s, the signal carrier $f_0$=193 THz, the value of chromatic dispersion D=17,000 ps/nm (value of chromatic dispersion of 1000 km standard single-mode fiber), the frequency offset Δf=1 GHz, then the value of time delay can reach up to 137 ps (approximately 4 symbol periods). Frequency offset is usually time-variant, and if frequency offset varies within the range of ±1 GHz, the value of time delay will vary within ±4 symbol periods. This generally exceeds the capabilities of the adaptive filter 113 to dynamically track and compensate channel variations, thereby causing decrease in system performance.

It is easily conceivable under such circumstances to increase the number of taps of the adaptive filter 113. However, this will require more number of taps, and even more taps will be needed if compensation of the residual chromatic dispersion is taken into consideration. The great number of taps reduces the capabilities of the adaptive filter to dynamically track and compensate channel variations, so that this is currently not a preferred solution.

FIG. 2 is a view schematically illustrating the structure of the apparatus for equalizing chromatic dispersion according to one embodiment of the present invention. As shown in FIG. 2, the apparatus for equalizing chromatic dispersion according to this embodiment of the present invention comprises a chromatic dispersion equalizing unit 2001 and an additional time delay removing unit 2002. The chromatic dispersion equalizing unit 2001 compensates chromatic dispersion, and the additional time delay removing unit 2002 removes chromatic dispersion equalization time delay of the chromatic dispersion equalizing unit 2001 in accordance with a value of frequency offset 117 from the digital coherent optical receiver. In the embodiments of the present invention, the term "to remove/removing" means, according to context, either or both of incapacitating the chromatic dispersion equalizing unit to generate time delay, or compensating or stabilizing the time delay generated by the chromatic dispersion equalizing unit.

Embodiments concerning the structure of the apparatus for equalizing chromatic dispersion according to the present invention are explained in greater detail below.

FIG. 3 illustrates the structure of an apparatus 200' for equalizing chromatic dispersion in time domain according to one embodiment of the present invention. As compared with the prior art as shown in FIG. 1(b), the time domain apparatus for equalizing chromatic dispersion shown in FIG. 3 is added with a time domain equalizer coefficient correcting unit 401 between the time domain equalizer coefficient storing unit 201 and the time domain equalizers (such as long FIR filters) 203, 204. The time domain equalizer coefficient storing unit 201 and the time domain equalizer coefficient correcting unit 401 in this embodiment correspond to the additional time delay removing unit 2002, and the time domain equalizers 203, 204 correspond to the chromatic dispersion equalizing unit 2001. The time domain equalizers 203, 204 filter the input signals 109 and 110 so as to compensate chromatic dispersion. The time domain equalizer coefficient storing unit 201 stores time domain equalizer coefficients set for the time domain equalizers 203 and 204 on presumption there is no frequency offset between the signal light and the local oscillation light, i.e., stores the compensation amount of chromatic dispersion and the time domain equalizer coefficients (such as long FIR filter coefficients) corresponding to the compensation amount of chromatic dispersion when it is presumed that there is no frequency offset between the signal light and the local oscillation light.

The time domain equalizer coefficient correcting unit 401 includes a first input terminal and a second input terminal, of which the first input terminal receives the time domain equalizer coefficients from the time domain equalizer coefficient storing unit 201, and the second input terminal receives the value of frequency offset 117 detected by the frequency offset monitor 116. The time domain equalizer coefficient correcting unit 401 corrects the filter coefficient 202 in accordance with the value of frequency offset 117 and supplies the corrected coefficient 402 to the time domain equalizers 203 and 204, thus avoiding interaction between chromatic dispersion compensation and frequency offset. Specific working principles are described in the following paragraphs.

Since the operating procedures of the time domain equalizers 203 and 204 are identical, the following explanation is made by only taking the time domain equalizer 203 as an example.

Let tap coefficients of the time domain equalizer 203 be $\{C_1, C_2, \ldots, C_N\}$, where $C_i$ is a complex and N is the number of taps of the time domain equalizer. Input signals 109 of the time domain equalizer 203 are of a complex sequence $\{x(1), x(2), x(3) \ldots \}$, and the output signal 111 thereof is $$y(k) = \sum_{i=1}^{N} C_i x(k+1-i). \quad (4)$$

If the coefficient read from the time domain equalizer coefficient storing unit 201 is $\{\alpha_1, \alpha_2, \ldots, \alpha_N\}$, it is obvious that $C_i = \alpha_i$ in the solution as shown in FIG. 1(b). If the time domain equalizer operates in accordance with this coefficient, additional time delay, namely chromatic dispersion equalization time delay, will be generated in the presence of frequency offset. In this embodiment $C_i$ is obtained by performing the following processing in the time domain equalizer coefficient correcting unit 401:

$$C_i = \alpha_i \exp[j(\phi_0 + i \cdot \Delta \omega \cdot \Delta t)] \quad (5)$$

In Equation (5) $\Delta \omega$ is the detected value of frequency offset 117 (also referred to as frequency offset of input signal) whose ideal value is the difference $\omega_0 - \omega_{LO}$ between the signal optical carrier frequency $\omega_0$ and the local oscillation optical frequency $\omega_{LO}$, $\Delta t$ is the sampling time spacing of the input sequence 109 of the equalizer, and $\phi_0$ is a random real constant which is usually set as $\phi_0 = -(N+1) \times \Delta \omega \times \Delta t / 2$. Physical significance of Equation (5) rests in the fact that: the frequency offset causes generation of additional linear phase variation in the input sequence 109 of the filter 203, so as to lead to additional time delay in the signal outputted from Equation (4), while a phase opposite to the relative phase variation as introduced by the frequency offset is stacked on the time domain equalizer coefficient in Equation (5), and this is equivalent to having removed the additional phase variation introduced by the frequency offset in the signal 109.

The time domain equalizer coefficient correcting unit 401 supplies the new filter tap coefficient 402 $\{C_1, C_2, \ldots, C_N\}$ as obtained by calculation to the filters 203 and 204.

FIG. 4 schematically shows a structure diagram of an apparatus 300' for equalizing chromatic dispersion in frequency domain according to one embodiment of the present invention. The apparatus for equalizing chromatic dispersion in FIG. 4 differs from that of the prior art in FIG. 1(c) in that a frequency domain equalizer coefficient correcting unit 501 is provided between the frequency domain equalizer coefficient storing unit 301 and the frequency domain equalizers 307, 308. In this embodiment, the frequency domain equalizer coefficient storing unit 301 and the frequency domain equalizer coefficient correcting unit 501 are corresponding to the additional time delay removing unit. The frequency domain equalizer coefficient storing unit 301 stores frequency domain equalizer coefficients used by the frequency domain equalizers 307, 308 for compensating the chromatic dispersion when the frequency offset is assumed as 0. The frequency domain equalizer coefficient correcting unit 501 has two input terminals, wherein a first input terminal receives the frequency domain equalizer coefficients from the frequency domain equalizer coefficient storing unit 301, a second input terminal receives the frequency offset 117 from the frequency offset monitor 116. The frequency domain equalizer coefficient correcting unit 501 corrects the frequency domain equalizer coefficients 302 based on the frequency offset 117, and sends the corrected coefficients 502 to the frequency domain equalizers 307, 308, so as to avoid interaction between the chromatic dispersion compensation and the frequency offset. The detailed working principle is described as follows.

As the working processes of the frequency domain equalizers 307, 308 are completely the same, hereinafter only the frequency domain equalizer 307 is described as an example.

The coefficient of the frequency domain equalizer 307 is assumed as $\{F_1, F_2, \ldots, F_M\}$, wherein $F_i$ is a complex, M is the length of FFT 303 and $M=2^P$, P is a positive integer. The coefficients outputted by the frequency domain equalizer coefficient storing unit 301 are ranked from low to high as $\{\beta_1, \beta_2, \ldots, \beta_M\}$, it is obvious that in the scheme of FIG. 1(c), $F_i = \beta_i$, and if the frequency domain equalizer 307 works based on these equalizer coefficients, a chromatic dispersion equalization time delay will be generated when a frequency offset exists.

In this embodiment, $F_i$ is acquired by performing the following processing in the frequency domain equalizer coefficient correcting unit 501:

$$F_i = \begin{cases} \beta_{i-L} & \text{if } 1 \leq i - L \leq M \\ 0 & \text{otherwise} \end{cases} \quad (6)$$

$$L = \text{round}\left(\frac{M \Delta \omega \Delta t}{2\pi}\right)$$

Wherein $\Delta \omega$ is the monitored frequency offset 117, $\Delta t$ is a sampling interval of the equalizer input sequence 109.

The frequency offset is not considered (i.e., the frequency offset is deemed as 0) for the frequency domain equalizer coefficients {β₁, β₂, ..., β_M} acquired from the frequency domain equalizer coefficient storing unit 301 based on a chromatic dispersion value (the chromatic dispersion value can be monitored or artificially set), thus {β₁, β₂, ..., β_M} are symmetrical with respect to frequency 0. The actual condition is that the received signal includes the frequency offset Δω, and the spectrum centers on Δω, thus the symmetric center of the frequency domain equalizer coefficients shall be moved to Δω, and such movement can be realized by operating according to formula (6).

The frequency domain equalizer coefficient correcting unit 501 sends the calculated new frequency domain equalizer coefficients 502 {F₁, F₂, ..., F_N} to the frequency domain equalizers 307, 308.

The previously mentioned chromatic dispersion equalizer 200' and chromatic dispersion equalizer 300' contain the storage unit 201 and the storage unit 301, respectively, and the coefficients stored therein are pre-calculated based on the chromatic dispersion value to be compensated. But according to another aspect of the invention, the coefficient storage unit in the chromatic dispersion equalizer can be replaced by a coefficient calculator.

FIG. 5 schematically shows a structure diagram of an apparatus 200" for equalizing chromatic dispersion in time domain according to another embodiment of the present invention. As shown in FIG. 5, the apparatus for equalizing chromatic dispersion in time domain of this embodiment comprises a time domain equalizer coefficient calculation unit 601, and time domain equalizers 203, 204. The time domain equalizer coefficient calculation unit 601 calculates time domain equalizer coefficients shall be used by the time domain equalizers 203, 204, based on the frequency offset 117. The processing of the time domain equalizer coefficient calculation unit 601 is detailedly described as follows.

Firstly, determining a frequency domain transfer function based on the frequency offset 117. In details, assuming the optical fiber chromatic dispersion as D, then the frequency domain transfer function of the optical fiber chromatic dispersion is:

$$\exp\left[j\frac{\pi V_L D}{\omega_0^2}(\omega - \omega_0)^2\right] \quad (7)$$

Wherein ω₀ is optical carrier frequency of a transmitter, and V_L is vacuum light velocity; an optical signal is moved to the baseband via a coherent detection, and the equivalent frequency domain transfer function of the optical fiber chromatic dispersion becomes:

$$\exp\left[j\frac{\pi V_L D}{\omega_0^2}(\omega - \Delta\omega)^2\right] \quad (8)$$

Wherein ω₀ is a frequency offset between signal and local oscillation light, that is to say, the determined frequency domain transfer function reflects the influence of Δω.

In order to compensate the chromatic dispersion, the equalizer is expected to have a transfer function mutually inverse with formula (8). Thus an inverse function of the frequency domain transfer function of the optical fiber chromatic dispersion is subsequently determined, as shown in formula (9).

$$H_{EQ}(\omega) = \exp\left[-j\frac{\pi V_L D}{\omega_0^2}(\omega - \Delta\omega)^2\right]G(\omega - \Delta\omega) \quad (9)$$

Wherein G(ω−Δω) is a window function centering at Δα, such as a Gauss window function $$G(\omega) = 2^{-\left(\frac{\omega}{2\pi B_{3dB}}\right)^2/2},$$

wherein $B_{3dB}$ is a 3 dB bandwidth of the Gauss window and it is usually selected based on a signal symbol rate. The purpose of windowing (i.e., multiplying with G(ω−Δω)) is to accelerate the attenuation of the equalizer coefficients to reduce the tap number of the equalizer.

Finally, performing an inverse Fourier transform of the windowed inverse transfer function, so as to obtain the time domain equalizer coefficients, i.e., the tap coefficients of the long FIR filters 203, 204, see formula 10:

$$C_k = \frac{\Delta t}{2\pi}\int_{-\pi/\Delta t}^{\pi/\Delta t} H_{EQ}(\omega)\exp\{j\omega[k-(N+1)/2]\Delta t\}d\omega \quad (10)$$
$$= \frac{\Delta t}{2\pi}\int_{-\pi/\Delta t}^{\pi/\Delta t}\exp\left[-j\frac{\pi V_L D}{\omega_0^2}(\omega - \Delta\omega)^2\right]$$
$$G(\omega - \Delta\omega)\exp\{j\omega[k-(N+1)/2]\Delta t\}d\omega$$

Wherein Δt is the sampling interval of the input signal, and N is the tap number of the equalizer.

In this embodiment, the time domain equalizer coefficient calculation unit 601 is corresponding to the additional time delay removing unit, and the time domain equalizers 203, 204 are corresponding to the chromatic dispersion equalizing unit.

FIG. 6 illustrates the structure of an apparatus 300" for equalizing chromatic dispersion in frequency domain according to another embodiment of the present invention. As shown in FIG. 6, the chromatic dispersion equalizer of the embodiment comprises a frequency domain equalizer coefficient calculation unit 701, FFTs 303, 304, frequency domain equalizers 307, 308, and IFFTs 311, 312. The frequency domain equalizer coefficient calculation unit 701 calculates frequency domain equalizer coefficients shall be used by the frequency domain equalizers 307, 308, based on the frequency offset, and sends the coefficients to the frequency domain equalizers 307, 308.

The frequency domain equalizer coefficient calculation unit 701 may comprise an optical fiber transfer function determination unit, an optical fiber transfer function inverse function determination unit, a windowing unit and an equalizer coefficient determination unit. To be noted, processing of the optical fiber transfer function determination unit, the optical fiber transfer function inverse function determination unit, and the windowing unit can be carried out in advance, so that the finally determined result can be stored in the storage unit, and directly called by the frequency domain equalizer coefficient determination unit.

A calculation process of the frequency domain equalizer coefficient calculating unit 701 will be explained with reference to FIG. 7.

FIG. 7 is a process flowchart schematically showing the frequency domain equalizer coefficient calculating unit 701 according to an embodiment of the present invention.

As shown in FIG. 7, at step 7001, a corrected optical fiber transfer function is given according to the target chromatic dispersion value and the monitored frequency offset (see Formula 8). Then at step 7002, an inverse function of the optical fiber transfer function is given:

$$\exp\left[-j\frac{\pi V_L D}{\omega_0^2}(\omega - \Delta\omega)^2\right].$$

Then at step 7003, a "Window" is added the inverse function (see Formula 9). Then at step 7004, the frequency domain equalizer coefficient (i.e., equalizer coefficients used by the frequency domain equalizers 307 and 308) is obtained according to Formula II through substituting frequency values to which equalizer coefficients correspond into the "Windowed" inverse transfer function.

$$F_k = H_{EQ}\left(\frac{2\pi(-M/2+k-1)}{M\Delta t}\right) \quad (11)$$
$$= \exp\left\{-j\frac{\pi V_L D}{\omega_0^2}\left[\frac{2\pi(-M/2+k-1)}{M\Delta t} - \Delta\omega\right]^2\right\}$$
$$G\left[\frac{2\pi(-M/2+k-1)}{M\Delta t} - \Delta\omega\right]$$

where $\{-1/(2\Delta t), -(M-2)/(2M\Delta t), \ldots, (M-2)/(2M\Delta t)\}$ are frequency values to which the frequency domain equalizer coefficients $\{F_1, F_2, \ldots, F_M\}$ correspond, i.e., $(-M/2+k-1)/(M\Delta t)$ is the frequency value to which $F_k$ corresponds, M is the number of the frequency domain equalizer coefficients (i.e., the length of FFT), $M=2^P$ and P is positive integer.

In the embodiment, the frequency domain equalizer coefficient calculating unit corresponds to the additional time delay removing unit.

Furthermore, as should be noted, the process in FIG. 7 would also apply to the time domain equalizer.

FIG. 8 schematically illustrates the structure of an apparatus 200''' for equalizing chromatic dispersion in time domain according to yet another embodiment of the present invention. Compared with the chromatic dispersion equalizing device in FIG. 1(b), the chromatic dispersion equalizing device of the embodiment in FIG. 8 adds an additional time delay calculator 801 and registers 803 and 804. The additional time delay calculator 801 calculates an additional time delay value according to $$\frac{2\pi V_L D\Delta\omega}{\omega_0^2}$$

with the input frequency offset 117 and the target chromatic dispersion value, and sends corresponding control signals 802 to the registers 803 and 804. The registers 803 and 804 reduce their own time delay value by $$\frac{2\pi V_L D\Delta\omega}{\omega_0^2},$$

so as to compensate additional time delay change. When frequency offset is zero, the registers have a fixed initial time delay $\tau_0$ and a maximum adjustable time delay $\tau_{max}$, where the initial time delay and the maximum adjustable time delay should appropriately valued so that its adjusting range is equal to or greater than the additional time delay value introduced by the chromatic dispersion and the frequency offset, i.e., $$-\tau_0 \leq \frac{2\pi V_L D\Delta\omega}{\omega_0^2} \leq \tau_{max}.$$

In the technical solution, although the registers themselves would introduce a register time delay, the register time delay may be appropriately controlled so that the change of register time delay is opposite to the additional time delay value introduced by the chromatic dispersion and the frequency offset. As such, the overall time delay would approximate to a fixed value and operation of the butterfly filter would not be affected.

The registers 803 and 804 may be positioned before 203 and 204, as illustrated in dashed block in FIG. 8.

In the embodiment, the additional time delay calculator 801 and registers 803 and 804 correspond to the additional time delay removing unit. The filter coefficient storing unit 201 and filters 203 and 204 correspond to the chromatic dispersion equalizing unit.

FIG. 9 schematically shows a structure diagram of an apparatus for equalizing chromatic dispersion in frequency domain according to yet another embodiment of the present invention. Compared with the chromatic dispersion equalizing device in FIG. 1(c), the frequency domain chromatic dispersion equalizing device of the embodiment in FIG. 9 adds an additional time to delay calculator 901 and registers 903 and 904. The operation of the additional time delay calculator 901 and registers 903 and 904 corresponds to the operation of the additional time delay calculator 801 and registers 803 and 804, respectively. Hence, the description is omitted for brevity.

Similarly, the registers 903 and 904 also may be positioned before the frequency domain equalizers 307 and 308, as illustrated in dashed block in FIG. 9.

FIG. 10 is a diagram showing a digital coherent optical receiver using the chromatic dispersion equalizers 200', 200'', 200''' or 300', 300'' or 300''' of the present invention.

Compared with the digital coherent optical receiver in FIG. 1(a), with respect to the digital coherent optical receiver in FIG. 10, the frequency offset 117 obtained by the frequency offset monitor 116 should be provided to the chromatic dispersion equalizers. The rest part of the structure may be equivalent to that in the prior art. Furthermore, in FIG. 10, the connection relationship between the frequency offset monitor 116 and filter 113, the frequency offset compensator 118 and 119 may vary. Those skilled in the art will recognize such modifications without departing from the scope of the present invention.

The method and apparatus of embodiments of the invention may be embodied in the digital domain while not increasing DSP module operating frequency, and hence reduce cost.

The apparatus and method of the invention may be embodied in hardware and/or in the combination of hardware and software. The invention relates to such computer readable programs that when executed by logic elements, the computer to readable programs may enable the logic elements to realize above apparatus or components, or may enable the logic elements to realize above step or method. The invention also relates to storage devices for storing computer programs, such as a hard disk, a magnetic disk, CD-ROM, DVD, or flash.

Although the invention has been shown and described with respect to certain preferred embodiments, both the foregoing detailed description is exemplary and explanatory and are not restrictive of the invention. It is obvious that equivalents and modifications will occur to others skilled in the art who benefit from this application. The present invention includes all such equivalents and modifications, and is limited only by the scope of the following claims.

The invention claimed is:

1. An apparatus for equalizing chromatic dispersion, comprising:
   a chromatic dispersion equalizing unit, for compensating chromatic dispersion of an input signal; and
   an additional time delay removing unit, for removing, in accordance with frequency offset of the input signal, chromatic dispersion equalization time delay generated by the chromatic dispersion equalizing unit,
   wherein:
      the chromatic dispersion equalizing unit includes a first time domain equalizer and a second time domain equalizer; and
      the additional time delay removing unit includes a time domain equalizer coefficient storing unit and a time domain equalizer coefficient correcting unit, of which the time domain equalizer coefficient storing unit stores time domain equalizer coefficients used by the first time domain equalizer and the second time domain equalizer when the frequency offset is supposed to be zero, and the time domain equalizer coefficient correcting unit corrects, in accordance with the frequency offset, the time domain equalizer coefficients and transmits the corrected time domain equalizer coefficients to the first time domain equalizer and the second time domain equalizer.

2. A digital coherent optical receiver, comprising a frequency offset monitor, characterized in that the digital coherent optical receiver includes the apparatus for equalizing chromatic dispersion according to claim 1, and that the additional time delay removing unit removes, in accordance with frequency offset from the frequency offset monitor, chromatic dispersion equalization time delay generated by the chromatic dispersion equalizing unit.

3. An apparatus for equalizing chromatic dispersion, comprising:
   a chromatic dispersion equalizing unit, for compensating chromatic dispersion of an input signal; and
   an additional time delay removing unit, for removing, in accordance with frequency offset of the input signal, chromatic dispersion equalization time delay generated by the chromatic dispersion equalizing unit,
   wherein:
   the chromatic dispersion equalizing unit includes a first frequency domain equalizer and a second frequency domain equalizer; and
   the additional time delay removing unit includes a frequency domain equalizer coefficient storing unit and an equalizer coefficient correcting unit, of which the frequency domain equalizer coefficient storing unit stores frequency domain equalizer coefficients used by the first frequency domain equalizer and the second frequency domain equalizer when the frequency offset is supposed to be zero, and the frequency domain equalizer coefficient correcting unit corrects, in accordance with the frequency offset, the frequency domain equalizer coefficients and transmits the corrected frequency domain equalizer coefficients to the first frequency domain equalizer and the second frequency domain equalizer.

4. An apparatus for equalizing chromatic dispersion, comprising:
   a chromatic dispersion equalizing unit, for compensating chromatic dispersion of an input signal; and
   an additional time delay removing unit, for removing, in accordance with frequency offset of the input signal, chromatic dispersion equalization time delay generated by the chromatic dispersion equalizing unit,
   wherein:
   the chromatic dispersion equalizing unit includes a first time domain equalizer and a second time domain equalizer; and
   the additional time delay removing unit includes a time domain equalizer coefficient calculating unit for determining, in accordance with the frequency offset, time domain equalizer coefficients that should be used by the first time domain equalizer and the second time domain equalizer.

5. An apparatus for equalizing chromatic dispersion, comprising:
   a chromatic dispersion equalizing unit, for compensating chromatic dispersion of an input signal; and
   an additional time delay removing unit, for removing, in accordance with frequency offset of the input signal, chromatic dispersion equalization time delay generated by the chromatic dispersion equalizing unit,
   wherein:
   the chromatic dispersion equalizing unit includes a first frequency domain equalizer and a second frequency domain equalizer; and
   the additional time delay removing unit includes a frequency domain equalizer coefficient calculating unit for determining, in accordance with the frequency offset, frequency domain equalizer coefficients that should be used by the first frequency domain equalizer and the second frequency domain equalizer.

6. The apparatus for equalizing chromatic dispersion according to claim 5, characterized in that the frequency domain equalizer coefficient calculating unit includes:
   an optical fiber transfer function determining unit, for determining a transfer function of an optical fiber;
   an inverse function of optical fiber transfer function determining unit, for calculating an inverse function of the transfer function of the optical fiber determined by the optical fiber transfer function determining unit;
   a windowing unit, for adding window to the inverse function determined by the inverse function of optical fiber transfer function determining unit; and
   a frequency domain equalizer coefficient determining unit, for determining the frequency domain equalizer coefficients in accordance with the windowed inverse function.

7. An apparatus for equalizing chromatic dispersion, comprising:
   a chromatic dispersion equalizing unit, for compensating chromatic dispersion of an input signal; and
   an additional time delay removing unit, for removing, in accordance with frequency offset of the input signal, chromatic dispersion equalization time delay generated by the chromatic dispersion equalizing unit,
   wherein
   the chromatic dispersion equalizing unit includes a first time domain equalizer and a second time domain equalizer; and
   the additional time delay removing unit includes an additional time delay calculator, a first register and a second register, wherein the first time domain equalizer is connected to the first register, the second time domain equalizer is connected to the second register, the second time domain equalizer is connected to the second register, and the additional time delay calculator calculates, in accordance with the frequency offset, an additional time delay introduced by the chromatic dispersion equalizing unit, and instructs the first register and the second register to reduce the additional time delay.

8. The apparatus for equalizing chromatic dispersion according to claim 7, characterized in that the additional time delay calculator calculates the additional time delay in accordance with an expression of $$\frac{2\pi V_L D \Delta \omega}{\omega_0^2},$$

where $\omega_0$ is optical carrier frequency of a transmitter, $\Delta \omega$ is frequency offset between signal and local oscillation, $V_L$ is vacuum light velocity, and D is total value of chromatic dispersion of a transmission link.

9. A method for equalizing chromatic dispersion, comprising:
a chromatic dispersion equalizing step, for compensating chromatic dispersion of an input signal by a first time domain equalizer and a second time domain equalizer; and
an additional time delay removing step, for removing, in accordance with frequency offset of the input signal, chromatic dispersion equalization time delay generated in the chromatic dispersion equalizing step by correcting, in accordance with the frequency offset, a time domain equalizer coefficients used by the first domain equalizer and the second time domain equalizer when the frequency offset is supposed to be zero and by transmitting the corrected frequency domain equalizer coefficients to the first time domain equalizer and the second time domain equalizer.

10. A method for equalizing chromatic dispersion, comprising:
a chromatic dispersion equalizing step, for compensating chromatic dispersion of an input signal by a first frequency domain equalizer and a second frequency domain equalizer; and
an additional time delay removing step, for removing, in accordance with frequency offset of the input signal, chromatic dispersion equalization time delay generated in the chromatic dispersion equalizing step by correcting, in accordance with the frequency offset, a frequency domain equalizer coefficients used by the first frequency domain equalizer and the second frequency domain equalizer when the frequency offset is supposed to be zero and by transmitting the corrected frequency domain equalizer coefficients to the first frequency domain equalizer and the second frequency domain equalizer.

* * * * *

UNITED STATES PATENT AND TRADEMARK OFFICE
CERTIFICATE OF CORRECTION

PATENT NO. : 8,472,814 B2
APPLICATION NO. : 12/835251
DATED : June 25, 2013
INVENTOR(S) : Huijian Zhang et al.

Page 1 of 1

It is certified that error appears in the above-identified patent and that said Letters Patent is hereby corrected as shown below:

On the Title Page, Col. 1, After Prior Publication Data insert
-- Related U.S. Application Data
(63)  Continuation of application No. PCT/CN2009/071057, filed on Mar. 27, 2009. --.

Signed and Sealed this
Third Day of December, 2013

Margaret A. Focarino
*Commissioner for Patents of the United States Patent and Trademark Office*